United States Patent
Dan et al.

[11] Patent Number: 5,809,239
[45] Date of Patent: *Sep. 15, 1998

[54] LOAD BALANCING IN SERVERS BY ALLOCATING BUFFER TO STREAMS WITH SUCCESSIVELY LARGER BUFFER REQUIREMENTS UNTIL THE BUFFER REQUIREMENTS OF A STREAM CAN NOT BE SATISFIED

[75] Inventors: Asit Dan, West Harrison; Dinkar Sitaram, Yorktown Heights, both of N.Y.

[73] Assignee: International Business Machines Corporation, Armonk, N.Y.

[*] Notice: The term of this patent shall not extend beyond the expiration date of Pat. No. 5,572,645.

[21] Appl. No.: 677,408

[22] Filed: Jul. 9, 1996

Related U.S. Application Data

[63] Continuation of Ser. No. 280,419, Jul. 26, 1994, Pat. No. 5,544,327, which is a continuation-in-part of Ser. No. 204,038, Mar. 19, 1994, Pat. No. 5,572,645.

[51] Int. Cl.[6] .............. H04N 7/14; H04N 7/173; H04H 1/00; G06F 13/00

[52] U.S. Cl. .............. 395/200.33; 395/615; 348/7; 455/4.2

[58] Field of Search ............... 395/250, 154, 395/872, 200.08, 200.09, 615, 200.33; 348/7; 370/61, 94.1, 118, 235; 455/4.2

[56] References Cited

U.S. PATENT DOCUMENTS

| | | | |
|---|---|---|---|
| 5,179,662 | 1/1993 | Corrigan et al. | 395/250 |
| 5,371,532 | 12/1994 | Gelman et al. | 348/7 |
| 5,414,455 | 5/1995 | Hooper et al. | 348/7 |
| 5,451,982 | 9/1995 | Stern et al. | 345/127 |
| 5,461,415 | 10/1995 | Wolf et al. | 348/7 |
| 5,473,744 | 12/1995 | Allen et al. | 395/154 |
| 5,481,543 | 1/1996 | Veltman | 370/94.1 |
| 5,506,615 | 4/1996 | Awaji | 348/7 |
| 5,519,435 | 5/1996 | Anderson et al. | 348/8 |
| 5,550,577 | 8/1996 | Verbiest et al. | 348/7 |
| 5,566,208 | 10/1996 | Balakrishnan | 375/240 |

*Primary Examiner*—Gopal C. Ray
*Attorney, Agent, or Firm*—Richard M. Ludwin; Kevin M. Jordan

[57] ABSTRACT

A video server is provided with buffer manager which balances the loads on the various "movie storage" elements of a video server by preferentially buffering streams on highly loaded storage elements. The allocation of buffer takes place only when the storage element load increases due to the arrival of a new request or when buffer becomes available due to the pausing or stopping of an old request.

6 Claims, 8 Drawing Sheets

LOAD BALANCING IN SERVERS BY ALLOCATING BUFFER TO STREAMS WITH SUCCESSIVELY LARGER BUFFER REQUIREMENTS UNTIL THE BUFFER REQUIREMENTS OF A STREAM CAN NOT BE SATISFIED

I. CROSS REFERENCE TO RELATED APPLICATIONS

This application is a continuation of U.S. Ser. No. 08/280,419, filed Jul. 6 1994, a combination of U.S. Pat. No. 5,544,327, issued Aug. 6, 1996, by Dan et al., entitled "Load Balancing in Servers by Allocating Buffer to Streams with Successively Larger Buffer Requirements Until the Buffer Requirements of a Stream Can Not Satisified", which is a continuation-in-part of Ser. No. 08/204,038, filed Mar. 11, 1994, U.S. Pat. No. 5,572,643, issued Nov. 5, 1996, by Dan et al., entitled "Buffer Management Policy For An On-Demand Video Server". The aforementioned U.S. Patents are commonly owned with this application.

II. BACKGROUND OF THE INVENTION a. Field of the Invention

The present invention relates to a movie (video) on demand systems of the type wherein multiple clients are serviced by video streams delivered from a central video server.

b. Related Art

With the advent of digital video technology, it is feasible to provide video-on-demand services to a large number of clients over a geographically distributed network. The videos are stored on secondary storage devices (such as disks and tapes) on the server and delivered to the clients. Because of non-uniform demand for different movies, load imbalances amongst the secondary storage devices may occur. In such situations, the most heavily loaded secondary storage device can become a bottleneck.

One solution to the load balancing problem is to statically replicate popular movies on multiple secondary storage devices based on the expected load, such that the total demand for the movie can be spread among the devices having a copy of the movie. This is, however, expensive in terms of the storage space required. Additionally, it is difficult to determine exactly how much replication is required for any particular movie since, typically, the demand can not be exactly forecast. Static replication is also not well suited to dealing with the problem of time-varying load since the number of replicas needed may vary.

Dynamic replication is more effective on load surges that occur on a time scale comparable to the time to copy a video file or segment. In dynamic replication, movies or portions of movies are copied, as a function of present demand, from heavily loaded storage devices to more lightly loaded storage devices in order to reduce the load. The effectiveness of dynamic replication in dealing with sudden load surges is limited by the bandwidth of the secondary storage devices.

III. SUMMARY OF THE INVENTION

In light of the above, the inventors have provided a buffer manager that balances the loads across the server disks by using information about load imbalances in order to decide which streams to buffer.

IV. BRIEF DESCRIPTION OF THE DRAWING

Figure 1:
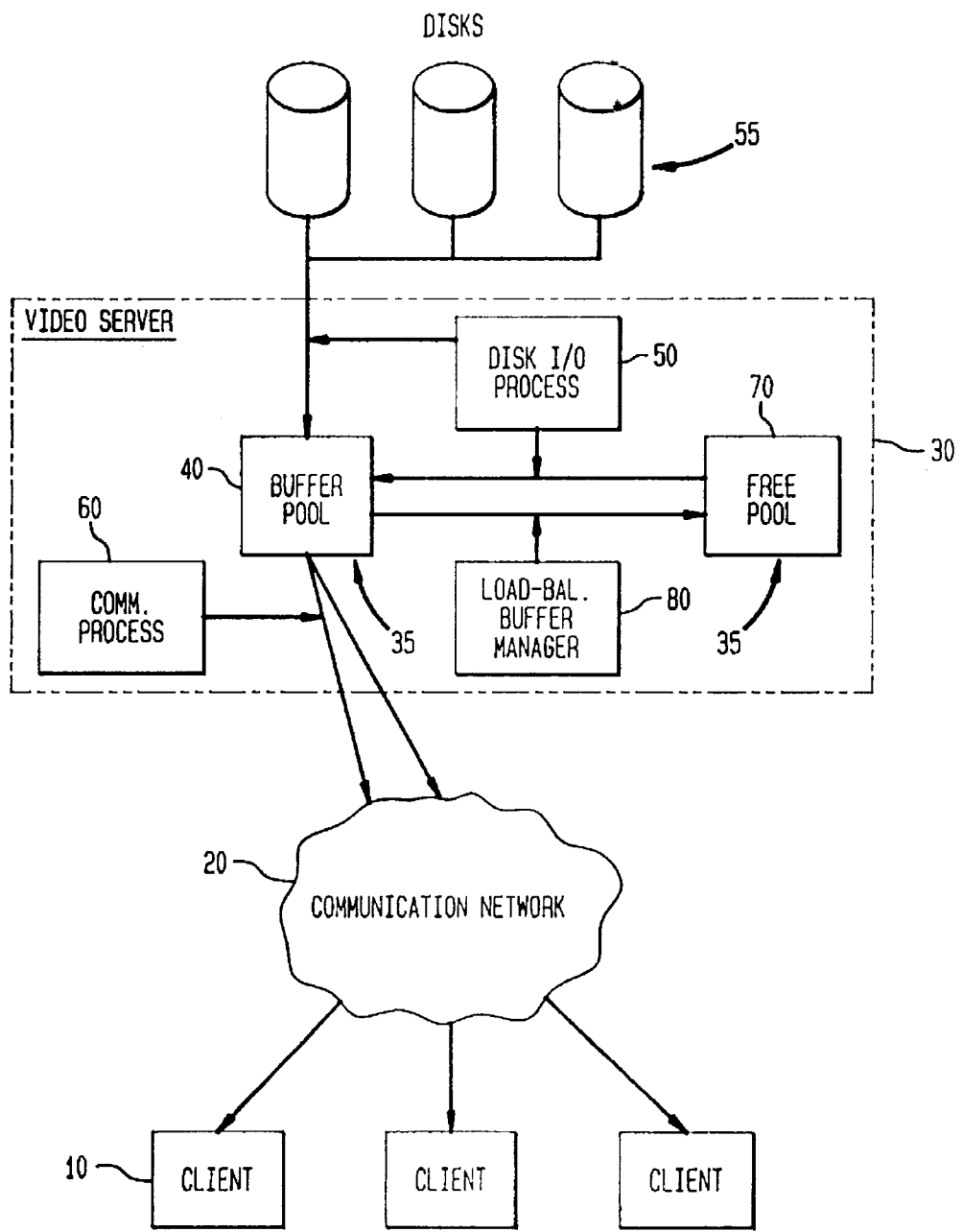
FIG. 1 is a block diagram of a video-on-demand system according to an embodiment of the present invention.

V. DETAILED DESCRIPTION OF A PREFERRED EMBODIMENT a. Overview

In accordance with an embodiment of the present invention, a buffer manager balances the loads on the various "movie storage" disks of a video server by preferentially buffering streams on highly loaded disks or other secondary storage devices. It should be understood, that while the present embodiment is described with respect to balancing the load across disks, the principles of the present invention are also applicable to balancing the load across other storage devices (such as tapes and jukeboxes) and across video servers. The allocation of buffer takes place only when the disk load increases due to the arrival of a new request or when buffer becomes available due to the pausing or stopping of an old request.

The amount of memory buffer required to enable a following stream to read the data from its preceding stream is a function of the time interval between the two streams and the compression method used. An estimate of the required buffer space can be obtained at the time when a new stream is created to form a new pair of consecutive streams.

The present buffer manager balances the load across the server disks by using information about load imbalances in order to decide which streams to buffer. At the time when a stream starts or restarts, it forms a consecutive pair with the stream for the same movie that is just ahead of it, if any. For any consecutive pair, the blocks brought in by the previous stream of the pair can be buffered so that the following stream reads them from buffer instead of disk. Therefore, the buffer requirement for the following stream of a consecutive pair is the amount of buffer required to store the required blocks.

For each disk, the buffer manager maintains a list of streams currently reading from that disk, in ascending order of buffer requirement. Note that if the movie is replicated, the preceding stream of the pair could be read from a different disk than the succeeding stream in the pair.

One objective of the load balancing performed by the buffer manager is to reduce the load imbalance across disks. When a new stream creates a load imbalance on a disk, the buffer manager attempts to reduce the load of the highly loaded disk by switching a stream of that disk to the buffer. Load imbalance is said to exist if the difference between the load on the highly loaded disk and the average load per disk exceeds a threshold. The stream with the lowest buffer requirement and still being served from that disk is selected. If sufficient buffer is not available, the buffer manager attempts to buffer the selected stream from the highly loaded disks by stopping the buffering of streams from the lightly loaded disks until enough buffer is available.

The objective of the load balancing function of the buffer manager changes from load balancing to minimizing the loss if the total load on the server is greater than the total server disk bandwidth. In this case, the streams with the lowest buffer requirement across all disks for which the load exceeds their corresponding bandwidth capacity are chosen. Once the load on a particular disk falls below the maximum bandwidth of the disk, further streams on that disk are not considered for buffering.

The present buffer manager load balancing method can be used together with a method of dynamic replication to provide an integrated approach to dynamic replication and buffering in a video server. Buffering and dynamic replication algorithms have additional characteristics that are complementary and hence, make them suitable to different scenarios with respect to load surges.

Dynamic replication is most effective on load surges that occur on a time scale comparable to the time to copy a video file or segment. The present buffer manager, on the other hand, can handle sudden load surges. The integrated method thus can handle both sudden and slow load imbalances.

b. Detailed Description

FIG. 1 is a block diagram of a video-on-demand system according to an embodiment of the present invention. It is assumed that clients 10 make requests from a video server 30 via a communication network 20. Clients can submit start and stop requests. The communication network 20 can be, for example, an Asynchronous Transfer Mode (ATM) network comprising optical fiber cables.

The video server 30 is embodied within the framework of a general purpose computer such as an RISC SYSTEM/6000 workstation or an ES/9000 mainframe (both available from International Business Machines Corporation of Armonk, N.Y.). As pertains to the embodiment of the present invention, the video server includes a buffer storage 35 which is instantiated in the video servers conventional semiconductor memory (not shown) and a number of processes 50, 60, and 80 which execute under control of the video servers operating system or main control program (not shown).

Movies (also referred to as video data) are stored in a number of disks 55 and/or other mass storage devices for storing movies (generally referred to as secondary storage) which are connected to the video server. The disks 55 can be, for example, in the form of a DASD array or RAID system. Other disks (not shown) store working data and program code for the video server 30. The program code includes processes such as the servers main control program, a movie scheduling program, a customer usage tracking program, and the various communications, I/O and buffer management processes.

The buffer storage 35 is subdivided into two pools—a free pool 70 that contains free blocks that can be used for the storage of data and a buffer pool 40 that has blocks containing data ready for transmission to the users. The disk I/O process 50 reads video data from the disks 55 into empty buffers obtained from the free pool 70 and inserts the buffers into the buffer pool 40. The communication process 60 transmits video data from the buffer pool 40 or disks 55 to the clients 10. The load balancing buffer manager 80 allocates buffers to streams so as to reduce the load imbalance across the disks or maximize the number of streams being served from buffer depending of the current load on the system. Those of skill in the art will recognize that the disks 10 are coupled to the video server by way of a controller (not shown) which also includes its own internal memory buffer.

The video data that has been read into the buffer for a client can be retained for re-transmission to other clients. This conserves server resources since the re-transmitted block does not have to be re-read from disk 55. Hence the buffer manager 80 selects a set of clients whose blocks will be retained in the buffer for subsequent re-transmission to other clients. Clients receiving re-transmitted blocks will be referred to as buffered clients.

Figure 2:
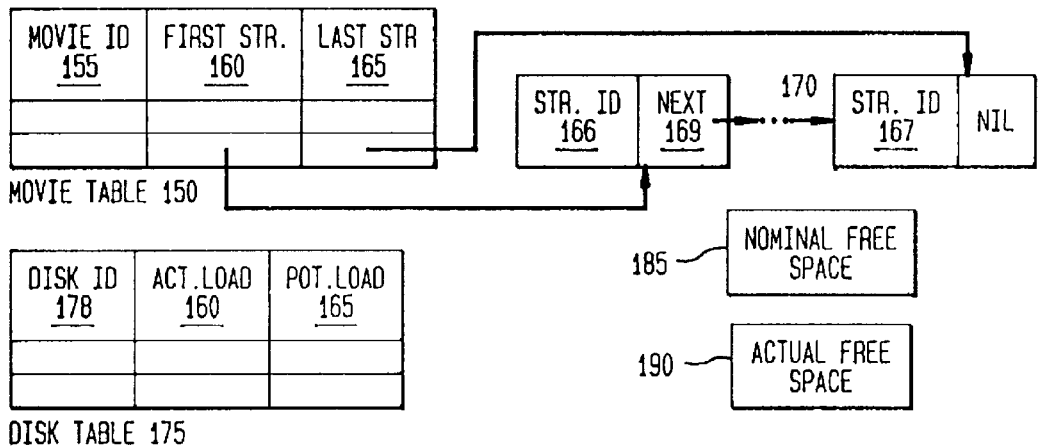
FIG. 2 shows data structures maintained by the buffer manager of FIG. 1.

A number of data structures are maintained by the buffer manager 80. These structures, shown in FIG. 2, include a stream table 110, a movie table 150, a disk table 175, a nominal free space counter 185 and an actual free space counter 190.

The stream table 110 contains one stream entry for each movie stream currently active. Each stream entry includes a number of fields 120–145. These fields contain, respectively, the identifier of the stream (Stream Id 120), the movie Identifier (Movie Id 125), the identity of the disk (if any) the stream is reading from (Disk Id 127), the current block being displayed to the client or clients (current block 130), a read state (Read State 135) which identifies the source of the video data being provided to the clients, an indicator for the amount of buffer necessary to service the stream from the buffer pool (Buffer Reqd. 140), and a mark (Mark 145) indicating whether the source of the stream is moveable to a disk from the buffer.

The read state 135 can take on 4 values—DISK if the stream is reading from disk, BUFFER if the stream is a buffered stream, DISK_TO_BUFFER if the stream is in the process of being switched from the disk to the buffer and BUFFER_TO_DISK if the stream is in the process of being switched from the buffer to disk.

The mark field (mark 145) is used by the buffer manager when allocating buffer and can take on four values—blank, MOVEABLE if the stream can be switched from buffer to disk and UNMOVABLE if it cannot and CANDIDATE if the buffer manager is trying to switch the stream to the buffer.

The movie table 150 contains the movie id (Movie Id 155) and movie list for each active movie. The movie list is a list of stream elements (170) for that movie in ascending order of current block. The movie table includes a pointer to the first and last elements of the list (First str 160 and Last str. 165, respectively). Each stream element includes the identifier of the stream (Str. Id 167) and a pointer to the next stream element (Next 169).

The disk table 175 keeps track of the load on the disks 55. For each disk, the disk table contains the identifier of the disk (disk id 178) the actual load on the disk (180) and the potential load (182). The potential load represents the number of streams that can be switched to this disk in order to free buffer for reducing the load on another disk. It is used by the buffer manager 80 when allocating buffer to the disk.

The two counters—the nominal free space 185 and the actual free space 190 are used to keep track of the amount of buffer space available in the free pool 70. The actual free space counter 190 is initialized to the total amount of buffer available. The actual free space counter is used to keep track of the actual amount of buffer available in the free pool 70.

The nominal free space counter is initialized to some high fraction (such as 90%) of the total buffer space available.

The nominal free space counter is used by the buffer manager 80 when allocating and deallocating space; i.e. when allocating buffer space, the buffer manager allocates only the amount of space specified by the nominal free space counter. This is because fluctuations in compression ratios may cause the actual amount of buffer required by a stream to vary. Hence, at times a stream may require more or less buffer space than allocated to it by the buffer manager. The difference between the initial values of the nominal and actual free space counters (10% in the example) is a safety buffer used for accommodating this variation.

Figure 3:
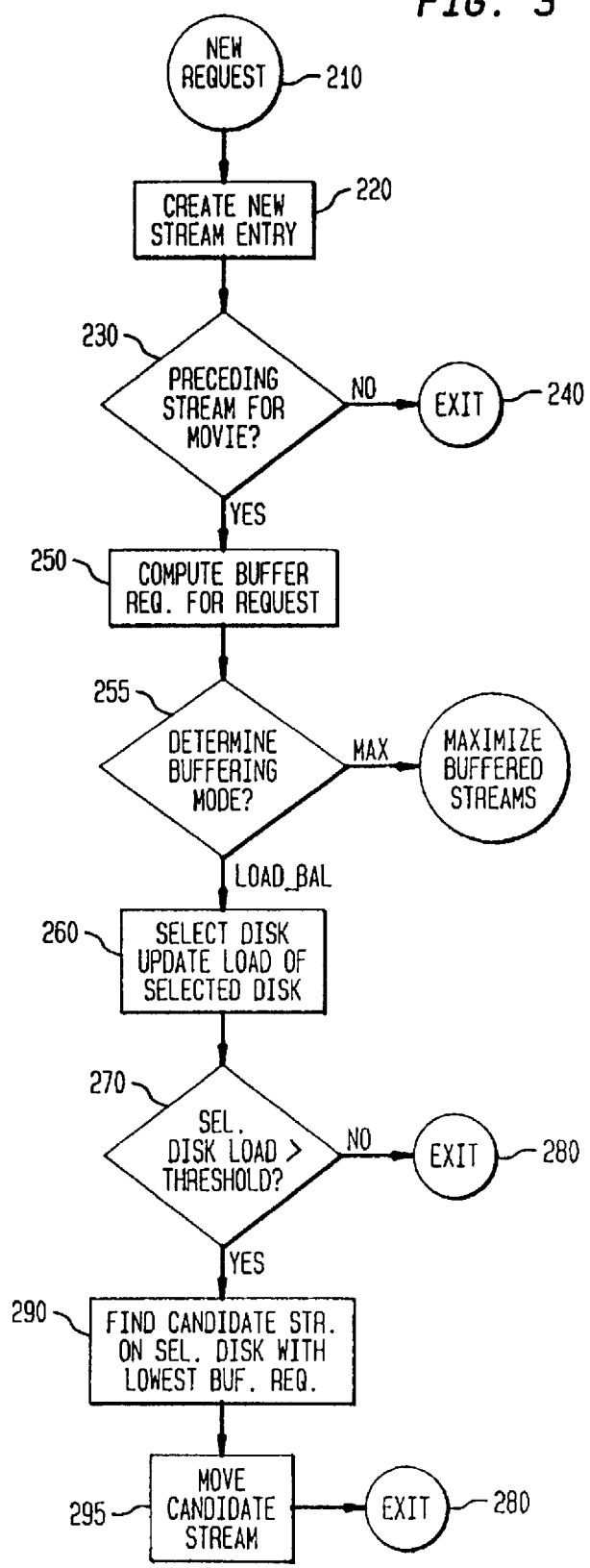
FIG. 3 is a flow chart of the handling of a start or resume request by the buffer manager of FIG. 1.

A flow chart of the handling of a start request by the buffer manager is shown in FIGS. 3A–3B. After a new request arrives in step 210, in step 220 the buffer manager creates a new stream entry for the request and inserts the new stream entry into the stream table 110. The read state of the stream entry is set to DISK. The current block 130 is set to the requested block and the stream entry is inserted into the movie list for the movie using the current block to determine its position.

In step 230, the buffer manager scans the movie list 170 to determine the closest preceding stream if any for the movie; i.e. the stream among all the streams reading this movie whose current block is closest to the current block of this request. If no such block exists, in step 240 buffer manager exits the new request handling process. If such a request exists, in step 250 the buffer manager sets the buffer reqd. field 140 in the stream entry to the amount of storage required to buffer all the blocks between the immediately preceding stream and the current request. In step 255 the buffer manager 80 determines the buffering mode. If the loads on all disks are greater than their corresponding load threshold, the buffer manager switches to the mode of maximizing the number of streams being served from the buffer. This can be accomplished as shown, for example in U.S. Pat. No. 5,572,645, issued Nov. 5, 1996, by Dan et al., entitled 'Buffer Management Policy For An On-demand Video Server,', which is incorporated by reference herein as if printed in full below. Otherwise, the buffer manager selects a disk (from among the disks 55) from which to service this request and updates the load on the selected disk in step 260.

Figure 4:
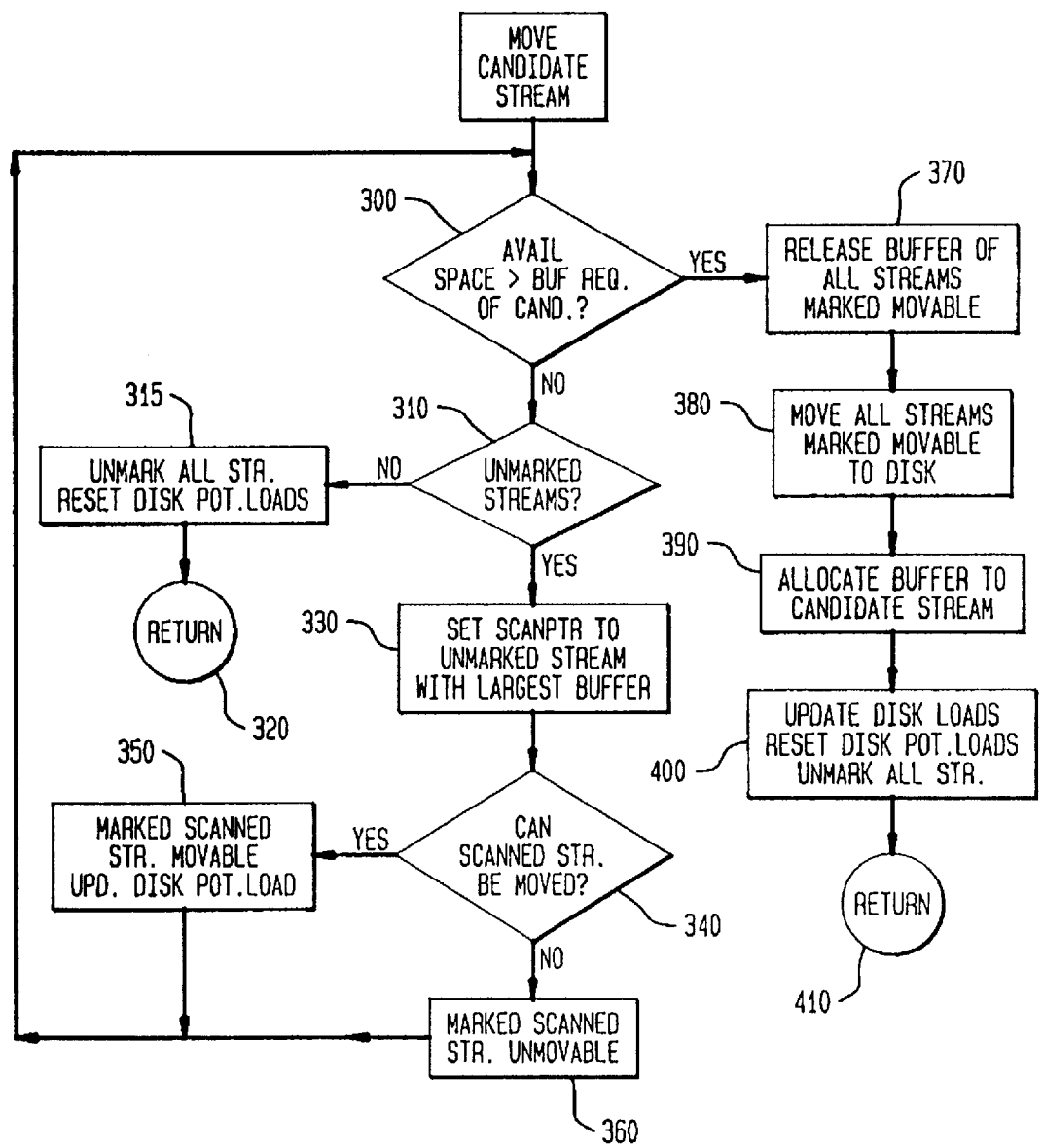
FIG. 4 is a flow chart of moving a candidate stream by the buffer manager of FIG. 1.

Next, in step 270, the buffer manager determines if the load on the selected disk is above a pre-specified threshold. If not, in step 280 buffer manager exits the new request handling process. If the load is above the threshold, in step 290 the buffer manager examines the stream table 110 to find the stream that is being serviced from the disk (read state 135 equal to BUFFER or BUFFER_TO_DISK) that has the lowest buffer requirement 140 and sets the mark field 145 of the stream entry for that particular stream to CANDIDATE. Then, in step 295 the buffer manager invokes the "Move candidate stream" procedure of FIGS. 4A and 4B and exits the new request handling process.

FIGS. 4A and 4B describe the buffer manager's "Move candidate stream" procedure. In step 300 the buffer manager examines the available space to determine if enough free buffer space exists to accommodate the candidate request. The available space is the nominal free space 185 together with the space held by moveable streams (streams with mark 145 equal to MOVEABLE). In the first pass through the loop, there will not be any such streams. If enough buffer space is available, the buffer manager initiates steps 370–410 to buffer the request.

If enough free buffer is not available, the buffer manager attempts to free some space by displacing some other stream. First, in step 310, the buffer manager checks if there are any more unmarked streams. If there are none, no additional buffer can be freed, hence the buffer manager unmarks all the stream entries and resets the disk potential loads in step 315 and, in step 320 returns a failure to the invoking process. If there are unmarked streams, in step 330 the buffer manager locates the unmarked stream with the largest buffer reqd 140. Then, in step 340, the buffer manager determines whether this stream can be moved to the disk and its buffer freed. The unmarked stream can be moved if moving the stream to disk does not cause the projected load on the unmarked stream's disk to exceed the projected load on the candidate stream's disk.

The projected load on the unmarked stream's disk is the sum of the actual load 180, the potential load 182 and the load imposed by the unmarked stream. The projected load on the candidate stream's disk is the actual load 180 minus the load of the candidate stream. If the unmarked stream cannot be moved, in step 360 its mark field 145 is set to UNMOVABLE. If it can be moved, in step 350 its mark field 145 is set to MOVEABLE and the potential load field 182 of the unmarked stream's disk is incremented by the load of the unmarked stream. In either case, the buffer manager then loops back to step 300.

If, in step 300, it is determined that the available space is greater than the buffer requirement of the candidate stream (i.e. the candidate stream can be moved), the buffer manager executes step 370. In step 370, the buffer of all streams marked moveable are released by incrementing the nominal free space counter 185 by an amount indicated in the buffer reqd. field 140 of the stream. Then, in step 380, the sources of the streams are moved to disks by setting the read state 135 of the streams to DISK. In step 390, the nominal free space counter 185 is decremented by the amount indicated in the buffer reqd. field 140 of the candidate stream and the read state 135 of the candidate streams is set to DISK_TO_BUFFER, effectively allocating buffer to the candidate stream. Finally, in step 400, the actual load 180 of the disks are updated to reflect the new loads on the disks and the potential load fields 182 of the disks are reset to 0 and the mark field 145 of the is set to blank. The buffer manager then returns a success indicator to the invoking process in step 410.

Figure 5:
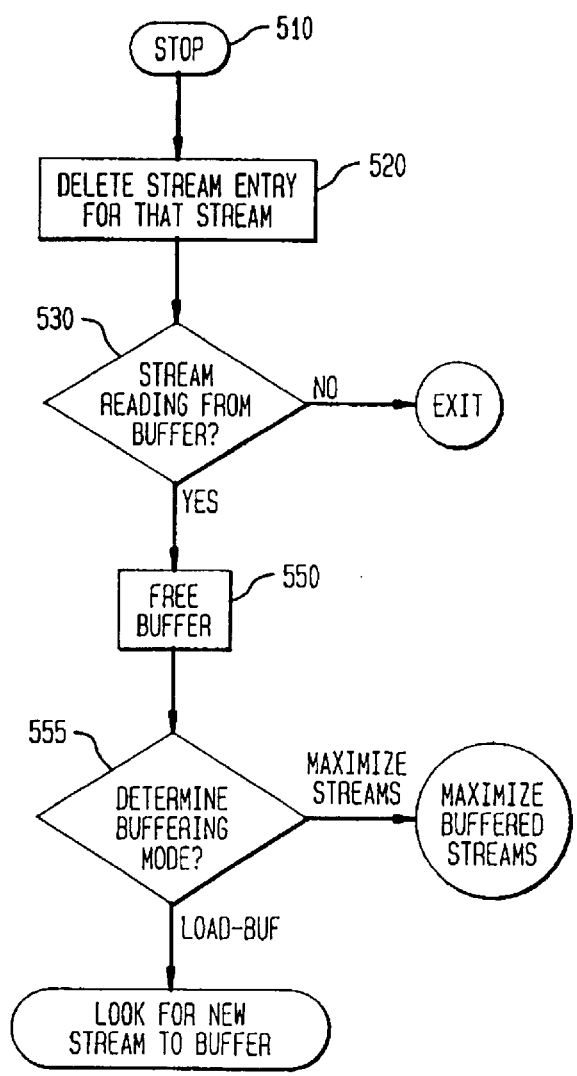
FIG. 5 is a flow chart of the actions taken by the buffer manager of FIG. 1 on receipt of a stop request.

The actions taken by the buffer manager on receipt of a "stop" request from a client are shown in FIG. 5. A stop request is a request from a client to terminate showing of the movie. In step 520, the stream entry for the stream is removed from the stream table 110 and the movie list in the movie table 150. In step 530, the buffer manager determines if the stream had allocated buffer by examining its read state 135 (BUFFER or DISK_TO_BUFFER). If not, the buffer manager exits the stop request handling procedure in step 540. If the stream had allocated buffer, in step 550 the buffer manager frees the buffer by incrementing the nominal free space counter 185 by the buffer reqd. 140. In step 555 the buffer manager determines the buffering mode (either load balancing or maximizing the number of streams served from the buffer). If the loads on all disks are still greater than their corresponding load threshold, then buffer manager goes into (or stays in, as the case may be) the mode of maximizing the number of streams being served from the buffer. Otherwise, the buffer manager then executes the "Look for new buffered stream" steps shown in FIG. 6. It should be understood that the principles of the present load balancing buffer manager can also be applied to client "pause" requests.

Figure 6:
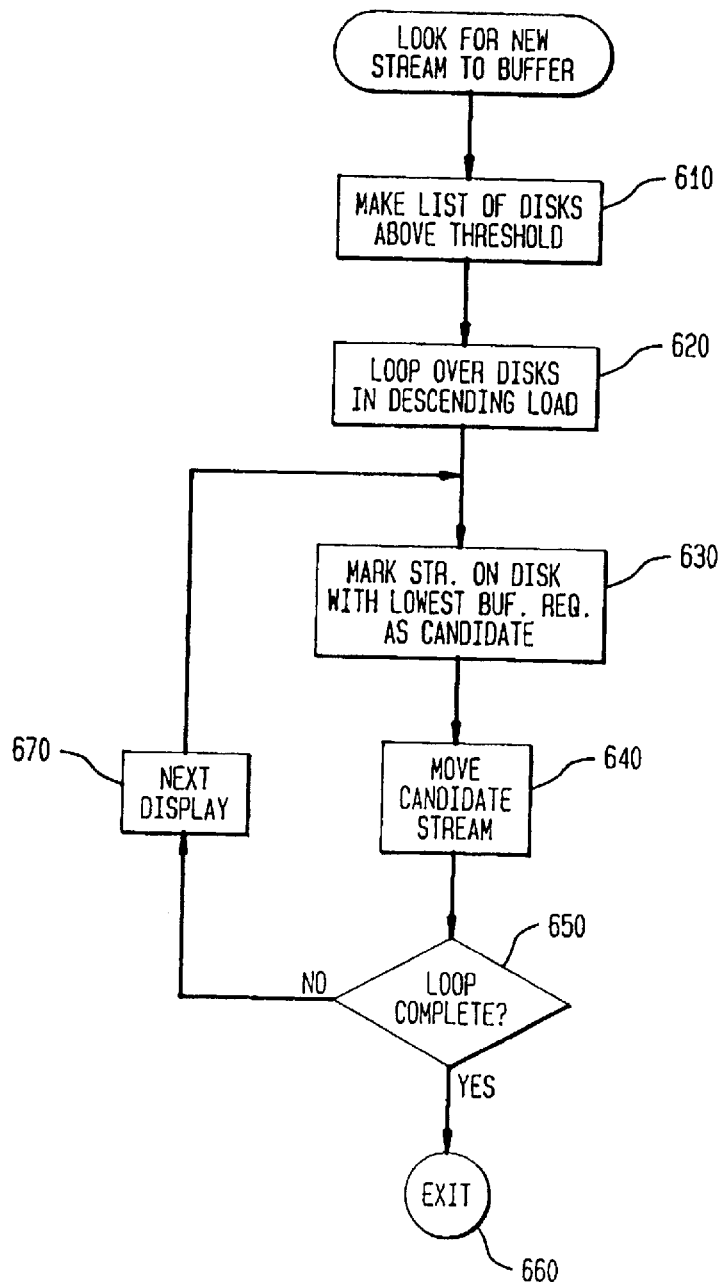
FIG. 6 is a flow chart of the steps taken by the buffer manager of FIG. 1 to find buffered streams when new buffer becomes available.

FIG. 6 shows the steps taken by the buffer manager to find non-buffered streams to buffer when new buffer becomes available. In step 610, the buffer manager makes a list of disks whose actual load is above a predetermined load imbalance threshold. The load imbalance threshold can be specified by the system administrator or determined by a load balancing process executing on the system. Then, in step 620, the buffer manager starts a loop over the disks in the list in descending order of load. For the selected disk, the buffer manager finds the stream with the lowest buffer requirement and marks this stream (mark field 145) as a candidate stream. It then executes the "Move candidate stream" procedure (of FIG. 4) in step 640. When the move candidate procedure has been completed, in step 650 the buffer manager then checks to see if the loop is complete and if so, exits the "Look for new stream to buffer" procedure in step 660. Otherwise, the buffer manager selects the next disk in step 670 and then re-executes the loop starting again at step 630.

Figure 7A:
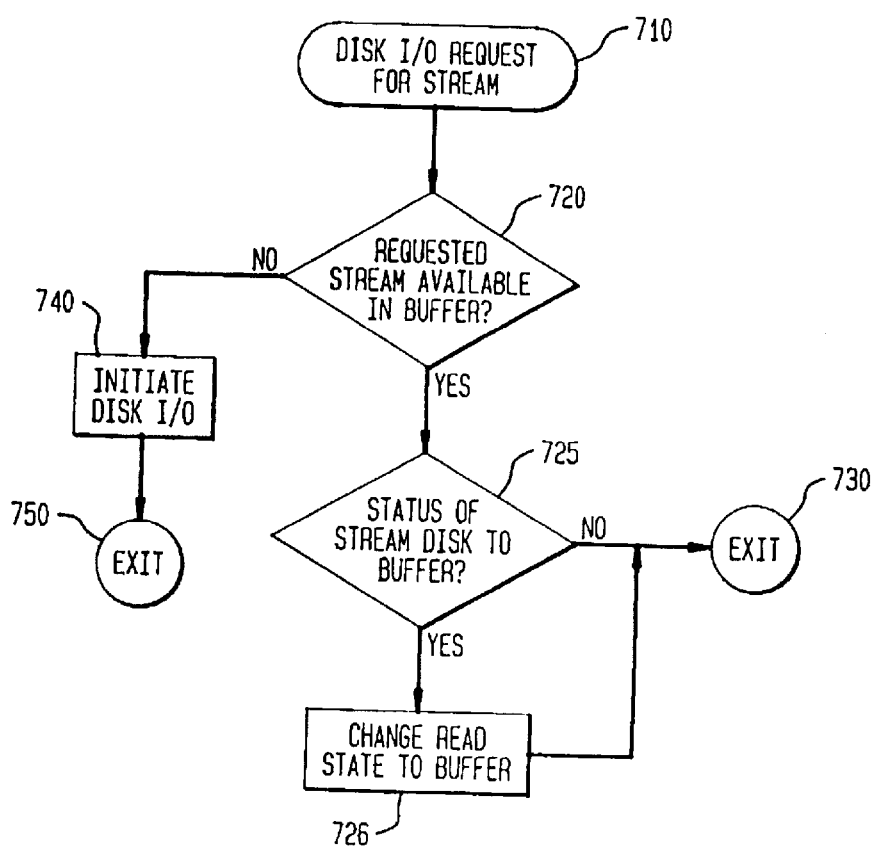
FIGS. 7A and 7B show, respectively, the interactions between the disk I/O process and the communication process with the buffer manager of FIG. 1.
Figure 7B:
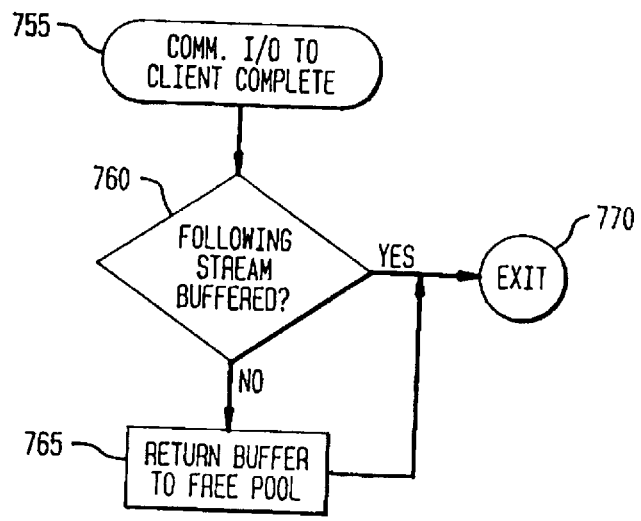

FIGS. 7A and 7B show the interactions between the disk I/O process 50, the communication process 60 and the load balancing buffer manager 80. In step 710, the disk I/O process 50 receives a request from a client to read a block from the disk. Before initiating an I/O operation to read a requested block, in step 720 the disk I/O process 50 looks in the buffer pool in step 720 to determine if the requested block has been read in. If it has, in step 723 the disk I/O process checks the read state of the stream to see if it is DISK_TO_BUFFER. If it is not, the disk I/O process exits in step 730. If it is DISK_TO_BUFFER, in step 726 the disk I/O process changes the read state to BUFFER and then exits in step 730. If not, in step 740 the disk I/O process gets a free buffer from the free pool, decrements the actual free space counter, starts the I/O and then exits in step 750.

After transmitting a block, the communication process 60 checks the read state of the following stream in step 760. If the read state is BUFFER or DISK_TO_BUFFER, the communications process exits in step 770. Otherwise, in step 765 the communication process increments the actual free space counter 190 and returns the block to the free pool 70.

Figure 8:
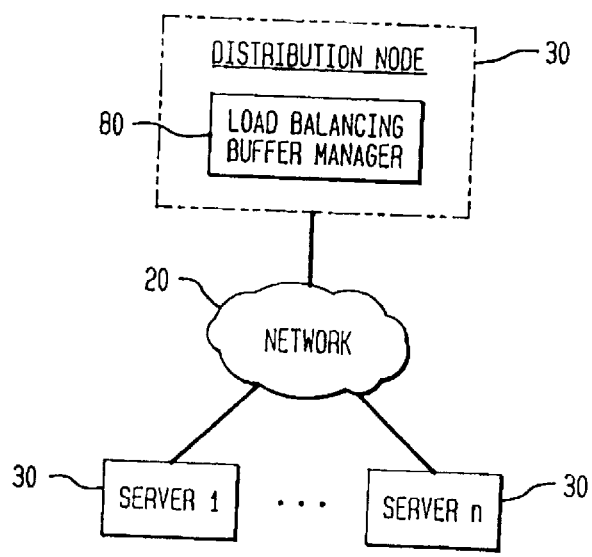
FIG. 8 is a block diagram of a system having a distribution node coupled to multiple server nodes by way of communication network.

FIG. 8 is a block diagram of a system having a distribution node coupled to multiple server nodes by way of communication network. In this embodiment the distribution node includes the load balancing buffer manager which balances the load across the video servers in accordance with the foregoing principles.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of managing memory buffer in a video server, wherein a plurality of clients are served from video streams provided from disks, comprising the steps of:

determining buffer requirements of a plurality of the video streams, the buffer requirements being a number of frames separating each video stream from an immediately previous video stream carrying the same video;

creating a list of streams being served from each of the disks, ordered by the buffer requirement of each of the streams;

determining when to balance a load across the disks;

allocating the buffer to the streams on a most heavily loaded one of the disks so as to serve the streams from the buffer, starting from a stream with a smallest buffer requirement and proceeding to streams with larger buffer requirements until the buffer requirement of a stream can not be satisfied; and retaining blocks of the immediately preceding stream in the buffer allocated to its following stream and discarding the blocks from the buffer as they are read by a client viewing the following stream.

2. A method of managing memory buffer in a video server, wherein a plurality of clients are served from video streams provided from disks, comprising the step of:

determining buffer requirements of a plurality of the video streams, the buffer requirements being a number of frames separating each video stream from an immediately previous video stream carrying the same video;

creating a list of streams being served from each of the disks, ordered by the buffer requirement of each of the streams;

selecting a buffering mode from one of (a) balancing a load across the disks and (b) maximizing streams that can be served from the buffer;

when the mode is balancing the load across the disks, allocating the buffer to the streams on a most heavily loaded one of the disks so as to serve the streams from the buffer, starting from a stream with a smallest buffer requirement and proceeding to streams with larger buffer requirements until the buffer requirement of a stream can not be satisfied; and when the mode is maximizing the streams that can be served from the buffer: examining the buffer requirements and as a function thereof, allocating the buffer so as to maximize a number of streams that can be provided therefrom regardless of the load distribution across the disks.

3. A system for managing memory buffer in a video server, wherein a plurality of clients are served from video streams provided from disks, comprising:

means for determining buffer requirements of a plurality of the video streams, the buffer requirements being a number of frames separating each video stream from an immediately previous video stream carrying the same video;

means for creating a list of streams being served from each of the disks, ordered by the buffer requirement of each of the streams;

means for determining when to balance the load across the disks;

means for allocating the buffer to the streams on a most heavily loaded one of the disks so as to serve the streams from the buffer, starting from a stream with a smallest buffer requirement and proceeding to streams with larger buffer requirements until the buffer requirement of a stream can not be satisfied; and means for retaining blocks of the immediately preceding stream in the buffer allocated to its following stream and discarding the blocks from the buffer as they are read by a client viewing the following stream.

4. A method of managing memory buffer in a video server, wherein a plurality of clients are served from video streams provided by video storage elements, comprising the steps of:

determining buffer requirements of a plurality of the video streams, the buffer requirements being a number of frames separating each video stream from an immediately previous video stream carrying the same video;

creating a list of streams being served from each of the storage elements, ordered by the buffer requirement of each of the streams;

identifying a most heavily loaded one of the storage elements;

allocating the buffer to the streams on the most heavily loaded one of the storage elements so as to serve the streams from the buffer, starting from a stream with a smallest buffer requirement and proceeding to streams with larger buffer requirements until the buffer requirement of a stream can not be satisfied; and retaining blocks of the immediately preceding stream in the buffer allocated to its following stream and discarding the blocks from the buffer as they are read by a client viewing the following stream.

5. A method of managing memory buffer in a server system, wherein a plurality of clients are served from data streams provided from storage elements, comprising the steps of:

determining buffer requirements of a plurality of the data streams, the buffer requirements being a number of data blocks separating each data stream from a previous data stream carrying the same information;

creating a list of the data streams being served from each of the storage elements, ordered by the buffer requirement of each of the data streams;

identifying a most heavily loaded one of the storage elements;

allocating the buffer to the streams on the most heavily loaded one of the storage elements so as to serve the data streams from the buffer, starting from a data stream with a smallest buffer requirement and proceeding to data streams with larger buffer requirements until the buffer requirement of a data stream can not be satisfied; and retaining blocks of the previous data stream in the buffer allocated to its following data stream and discarding the blocks from the buffer as they are read by a client consuming the following stream.

6. The method of claim 5 comprising the further step of updating the list when any of starting, stopping, pausing and resuming of a data stream; and responsive to the updating, identifying the most heavily loaded one of the storage elements and reallocating the buffer to the data streams being served from the most heavily loaded storage element.

* * * * *